(12) United States Patent
Hoole et al.

(10) Patent No.: US 11,949,734 B2
(45) Date of Patent: Apr. 2, 2024

(54) CLOUD NATIVE REALIZATION OF DISTRIBUTED RAN ELEMENTS

(71) Applicant: CHARTER COMMUNICATIONS OPERATING, LLC, St. Louis, MO (US)

(72) Inventors: Elliott Hoole, Parker, CO (US); Diwelawatte P. Jayawardene, Centennial, CO (US); Alec Hampton, Centennial, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 17/404,449

(22) Filed: Aug. 17, 2021

(65) Prior Publication Data
US 2023/0057469 A1    Feb. 23, 2023

(51) Int. Cl.
*H04L 67/10* (2022.01)
*H04L 67/56* (2022.01)

(52) U.S. Cl.
CPC .............. *H04L 67/10* (2013.01); *H04L 67/56* (2022.05)

(58) Field of Classification Search
None
See application file for complete search history.

(56) References Cited

U.S. PATENT DOCUMENTS

| | | | | |
|---|---|---|---|---|
| 2017/0244785 A1* | 8/2017 | Broustis | ............... | H04L 41/084 |
| 2018/0124670 A1* | 5/2018 | Alanen | ............... | H04W 36/165 |
| 2019/0289470 A1* | 9/2019 | Vaidya | ................. | H04W 16/18 |
| 2019/0319858 A1* | 10/2019 | Das | ....................... | H04L 5/0037 |
| 2019/0320494 A1 | 10/2019 | Jayawardene et al. | | |
| 2020/0329381 A1* | 10/2020 | Chou | ..................... | H04W 24/02 |
| 2022/0158912 A1* | 5/2022 | Ikäheimo | ............ | H04L 41/0883 |
| 2022/0413923 A1* | 12/2022 | Mukkamala | ............ | G06F 9/547 |

FOREIGN PATENT DOCUMENTS

| | | |
|---|---|---|
| WO | 2021011933 A1 | 1/2021 |
| WO | 2021013321 A1 | 1/2021 |

OTHER PUBLICATIONS

U.S. Appl. No. 63/114,444 (Year: 2020).*
U.S. Appl. No. 63/261,943 (Year: 2020).*
"2 Service Communications Proxy System Architecture", Oracle Communications Service Communication Proxy, Native User's Guide, Release 1.0, Apr. 2019.
Garg, "You need a robust signaling solution in G5 too!", Ericsson Blog, Oct. 17, 2019.
"Converged Software Products for Routing Interworking, Security and Number Portability" https://www.broadforward.com, 2021.

* cited by examiner

*Primary Examiner* — June Sison
(74) *Attorney, Agent, or Firm* — Patent Beach PC

(57) ABSTRACT

Various embodiments are directed to methods, apparatus, systems and the like for managing distributed radio access network (RAN) elements within a network associated with a network core, wherein for each of a plurality of distributed RAN elements (DREs) within the network associated with the network core a respective virtualized proxy element is configured to communicate with the DRE and mirror each of a plurality of functional elements (FEs) associated with the DRE.

20 Claims, 2 Drawing Sheets

US 11,949,734 B2

CLOUD NATIVE REALIZATION OF DISTRIBUTED RAN ELEMENTS

FIELD OF THE DISCLOSURE

The present disclosure generally relates to wireless communications systems and related networks, and more particularly to mechanisms for

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Fifth generation (5G) wireless access technology, known as New Radio (NR) as described/developed by the Third Generation Partnership Project (3GPP), is a Service-Based Architecture (SBA) where network functions based in the Control Plane are interconnected via a service message interface bus for exposing the 5G network capabilities within the Core Network ("core" or "5G core"). The 5G core communicates with and controls deployed radio access network (RAN) nodes, each of which uses use gNBs formed thereat to communicate with, and provide backhaul services to, user equipment (UE) connected thereto (e.g., mobile phones, sensors, etc.).

In various radio network deployment environments, such as those consistent with the O-RAN Alliance, each of the deployed RAN or O-RAN radio units (RUs, e.g., eNBs, gNBs, etc.) within a network of a network operator performs various Radio Access Network (RAN) functions such as providing backhaul services to user equipment (UE) connected thereto (mobile phones, sensors, etc.). The deployed RUs may have been procured from one or multiple vendors, where each vendor may offer some unique functionality, as well as a requirement that other vendor-specific equipment be used within the network to support RU functionality.

Some network architectures contemplate that each RAN RU from a specific vendor is connected to a RAN distributed unit (DU) from that vendor via an O-RAN Fronthaul interface, and each RAN-DU from that vendor is in turn connected to a RAN centralized unit (CU) from that vendor via F1 over DOCSIS and normal transport mechanisms. The RAN CUs (from any vendor used by the network operator) are then coupled to the 5G core via an NG interface. The RAN DU and RAN CU functions of a vendor may be implemented using virtualized or container implementations as virtualized distributed units (vDUs) and centralized units (vCUs). In fact, some network architectures contemplate that such vDUs and vCUs may be implemented via physically proximate containers (e.g., at the same data center or cloud-services provider), enabling direct F1 communications therebetween (i.e., avoiding DOCSIS transport), mixing and matching of multiple vendor entities and so on.

While the above-described architecture is especially well suited to highly centralized network management architectures, even in less centralized network management architectures the various deployed RANs are geographically remote from the network management architecture/functions. As such, the currently contemplated network management architectures suffer from various performance issues.

SUMMARY

Various embodiments are directed to methods, apparatus, systems and the like addressing practical limitations associated with virtualized radio access network (RAN) elements associated with a network core such as a 3GPP 4G/LTE or 5G network core. The network core may be traditionally implemented (i.e., non-virtualized), or implemented in a partially or fully virtual and/or containerized manner to include 3GPP 4G/LTE or 5G core network elements instantiated at a cloud-native platform in a network. The network core, however implemented, is configured to manage distributed RAN elements (DRE) such as RAN distributed units (DUs), RAN radio units (RUs), RAN centralized units (CUs) and the like via proxy elements created/operated at resources proximate or associated with the network core and corresponding to the actual or physical distributed/deployed RAN elements.

One embodiment comprises a method of managing distributed radio access network (RAN) elements within a network associated with a network core, the method comprising: for each of a plurality of distributed RAN elements (DREs) within the network associated with the network core, configuring a respective virtualized proxy element to communicate with the DRE and mirror each of a plurality of functional elements (FEs) associated with the DRE. In various embodiments the network core comprises a virtualized network core implemented via processing resources and non-transitory memory resources, the processing resources configured to execute software instructions stored in the non-transitory memory resources to provide thereby network core functions.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
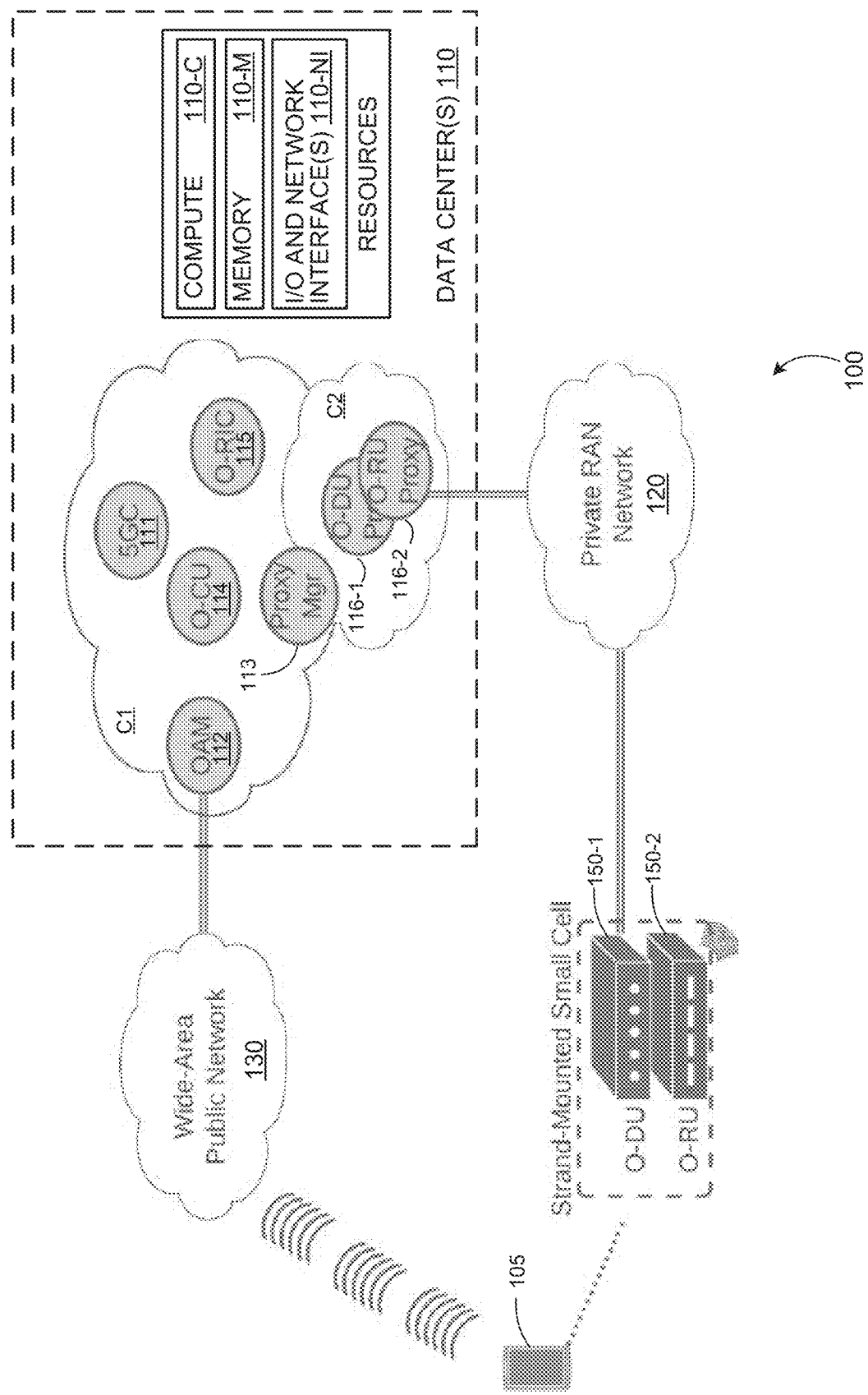
FIG. 1 depicts a simplified representation of a network services architecture useful in understanding the embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments are directed to methods, apparatus, systems and the like addressing practical limitations associated with virtualized radio access network (RAN) elements associated with a network core such as a 3GPP 4G/LTE or 5G network core. The network core may be traditionally implemented (i.e., non-virtualized), or implemented in a partially or fully virtual and/or containerized manner to include 3GPP 4G/LTE or 5G core network elements instantiated at a cloud-native platform in a network. The network core, however implemented, is configured to manage distributed RAN elements (DRE) such as RAN distributed units (DUs), RAN radio units (RUs), RAN centralized units (CUs) and the like via proxy elements created/operated at resources proximate or associated with the network core and corresponding to the actual or physical distributed/deployed RAN elements.

Various embodiments are directed to methods, apparatus, systems and the like wherein 5G core network nodes within a virtualized network core provide services to distributed radio access network (RAN) elements (DREs) such as gNBs, RAN radio units (RUs), RAN distributed units (DUs) and the like via respective proxies instantiated at or proximate a network core, such as a virtualized network core. The specific features/capability of the RAN elements may be accessed by, for example, an operation, administration and maintenance (OAM) system or function cooperating with various network core functions, wherein the OAM system in response to receiving a scanned bar code, quick response (QR) code, or other DRE identification (e.g., DRE identification code or label affixed to the DRE that may be scanned via a mobile device camera and then transmitted to the network core by the mobile device such as via a local or web-enabled setup application executed at the mobile device) so that a relevant proxy may be allocated/instantiated and then used to automatically provision the DRE.

FIG. 1 depicts a simplified representation of a network services architecture useful in understanding the embodiments. Specifically, FIG. 1 depicts one or more data centers 110 comprising compute resources 110-C (e.g., processing resources such as provided by one or more servers, processors and/or virtualized processing elements or other compute resources), memory resources 110-M (e.g., non-transitory memory resources such as one or more storage devices, memories and/or virtualized memory elements or storage resources), input/output (I/O) and network interface resources 110-NI, and other hardware resources and/or combined hardware and software resources suitable for use in implementing a plurality of virtualized network management elements such as described herein. Various other types of virtualized services platforms, servers, and other known systems may be used to implement the virtualized network management elements such as described herein. The compute or processing resources may also be configured to execute software instructions stored in the non-transitory memory resources to provide thereby other network functions (NFs) as described herein As depicted in FIG. 1, the compute 110-C, memory 110-M, I/O and network interface 110-NI and other resources (not shown) of the data center(s) 110 are used to instantiate a plurality of virtualized network management elements including, illustratively, a 5G core network 111, an operation, administration and maintenance (OAM) system 112, and a proxy manager 113. As previously noted, while FIG. 1 depicts an architecture using virtualized network management elements the various embodiments may also be use within the context of non-virtualized network management elements and/or a combination of virtualized network management elements and non-virtualized network management elements.

In the embodiment of FIG. 1, the instantiated virtualized network management elements further include several virtualized network management elements substantially conforming to those defined by the Open Radio Access Network (O-RAN) Alliance; namely, a RAN Intelligent Controller (MC) 115 and a Central Unit (CU) 114.

Generally speaking, the O-RAN Alliance contemplates an architecture wherein each of a plurality of RAN radio units (RUs) within a group of RUs communicates with a RAN distributed unit (DU), and each of the RAN-DUs communicates with a RAN centralized unit (CU) which is in turn coupled a network core (e.g., 4G/LTE or 5G network core). An O-RAN intelligent controller (MC) in communication with the DUs, CUs and core network enables interoperability across different hardware and software components in the O-RAN architecture, supporting various network functions, services optimization, and the like.

As depicted in FIG. 1. A strand-mounted small cell comprising a pair of physical devices 150 is installed at a location remote from that of the data center(s) 110, but in communication with the data center(s) 110 via a private RAN network 120, illustratively a 5G network comprising numerous radio units such as eNBs, gNBs, and supporting equipment forming a 5G network managed by the 5G core 111.

The physical devices 150 comprise distributed radio access network (RAN) elements (DREs), illustratively, a RAN distributed unit (DU) 150-1 and a RAN radio unit (RU) 150-2. As depicted, the RAN DU 150-1 is operably coupled to the private RAN network 120 and to the RAN RU 150-2. The RAN RU 150-2 provides wireless network services to user equipment (UE) 105 such as mobile phones, computers, sensors and other internet of things (IoT) devices and so on. The RAN DU 150-1 supports backhaul services to the RAN RU 150-2 in support of the wireless network services provided thereby to, illustratively, UE 105.

As depicted in FIG. 1, each of the RAN DU 150-1 and RAN RU 150-2 are communicatively coupled to respective proxies 116 instantiated at the data center(s) 110; namely, RAN DU proxy 116-1 and RAN RU proxy 116-2. The proxies 116 are managed by the proxy manager 113 in response to operational details provided by the OAM 112 and/or other management entities. For example, the proxy manager 113 may create or instantiate a proxy 116 in response to information received from the OAM 112 indicative of the discovery of a newly connected (or initialized) DU, RU, or other element communicating with or supporting the operations of the private RAN network 120.

The DRE 150 may comprise resources using licensed spectrum, unlicensed spectrum such as citizens broadband radio service (CBRS) spectrum, or a combination of licensed and unlicensed spectrum. The DRE 150 may, in various embodiments, include mid-band (e.g., 3.5 GHz) gNBs, low-band (e.g., under 1 GHz) gNBs, or a combination of mid-band and low-band gNBs. In the case of DRE 150 having Citizens Broadband Radio Service Device (CBSD) capability, allocations of CBRS spectrum are provided via a Spectrum Access System (SAS) (not shown).

Generally speaking, the various embodiments contemplate that the functions of a distributed RAN element (DRE) such as a gNB, RU, DU, and/or other DRE that are best implemented as embedded, high-performance functions using specific hardware/software, are implemented in this manner rather than instantiated at a data center. In particular, the various embodiments contemplate a cloud-native (virtualized) implementation of substantially all 4G/LTE/5G network core functions, wherein high performance functions otherwise poorly supported by a virtualized implementation are implemented as respective virtualized proxies invoked to cooperate with the preferred hardware/software of the DRE actually implementing the high performance function.

Various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various embodiments contemplate some or all of three main components; namely, (1) the creation and operation of proxy elements in the cloud-native environment, (2) the use of gNB, RU, DU, and/or other distributed RAN element (DRE) proxies to instantiate and operate corresponding physical/distributed RU, DU, and/or other elements, and (3) continuous, real-time performance optimization of physical/distributed elements via the cloud based proxies.

Figure 2:
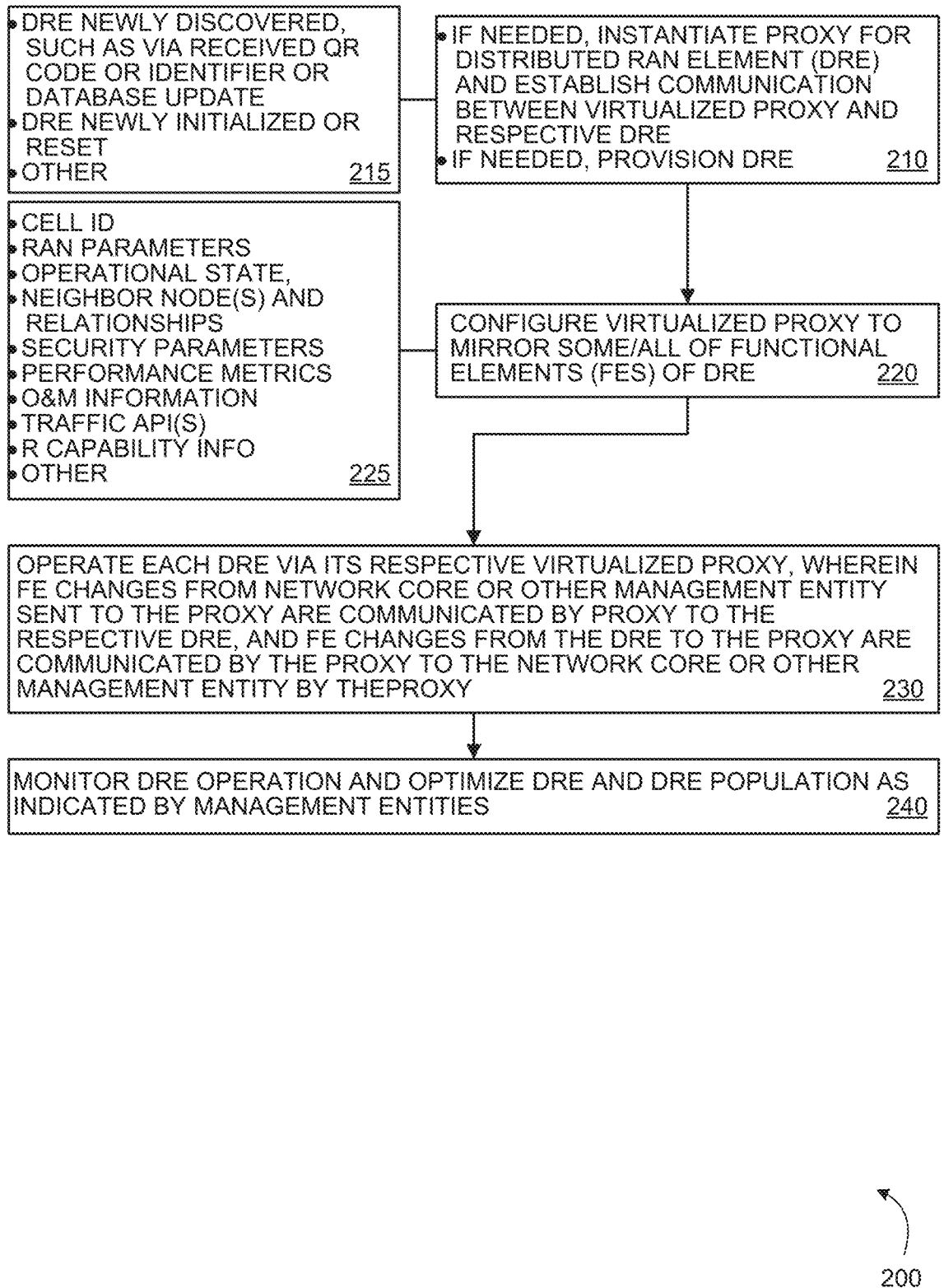
FIG. 2 depicts a flow diagram of a method of managing distributed radio access network elements according to an embodiment.

FIG. 2 depicts a flow diagram of a method of managing distributed radio access network elements according to an embodiment. As previously noted, FIG. 1 primarily depicts an architecture using virtualized network management elements the various embodiments may also be use within the context of non-virtualized network management elements and/or a combination of virtualized network management elements and non-virtualized network management elements. Similarly, FIG. 2 depicts a method suitable for use with within the context of non-virtualized network management elements and/or a combination of virtualized network management elements and non-virtualized network management elements At step 210, for a distributed RAN element (DRE) to be managed if a proxy does not currently exist then a new proxy is instantiated and communication between the DRE and its proxy is established. For example, proxies 116-1 and 116-2 are associated with and in communication with respective DRE 150-1 and 150-2. Referring to box 215, the DRE may be newly discovered, such as via a received bar code, quick response (QR code or other DRE identifier, or via a database update, or by some other mechanism. In any event, however the DRE becomes known to, or discovered by, the various management entities, an existing or new proxy is associated with that DRE and configured to communicate with that DRE.

At step 220, the virtualized proxy associated with the DRE is configured to mirror some or all of functional elements (FEs) associated with the DRE. Referring to box 225, such FEs may comprise, illustratively but not exhaustively, Cell ID, DRE configuration parameters or operating parameters, DRE Operational state, DRE neighbor node(s) information and relationships, DRE security parameters, DRE performance metrics, DRE OAM information, DRE traffic and/or other application programming interface (API) information, DRE capability information, and/or other information.

Generally speaking, the OAM system detects that a new DRE is present (or absent) and uses proxy management function to create/destroy proxies associated with certain elements. For example, in response to receiving a scanned QR code of a distributed RAN element (DRE) such as via UE 105 scanning the installed but not yet operational devices DU 150-1 or RU 150-2, the OAM 112 may responsively generate the relevant proxy or proxies within the virtualized environment to represent the physical devices (e.g., distributed RAN elements) associated with the QR code. For example, the UE 105 may comprise any mobile device executing a via a local or web-enabled DRE setup application configured to use camera or other optical input capability to scan a QR cod or other DRE identification code or label affixed to the DRE, and then use network connectivity capability to transmit the scanned DRE identification information and any ancillary information (e.g., location information, local network information, subscriber information, etc.) to the network core or OAM system.

In various embodiments, the DRE identification information and ancillary information effectively enable the OAM 112 to fully identify the DRE in terms of its capability, the relevant subscriber location and billing information, the DRE capability information, the local network configuration, and the like. The OAM 112 may retrieve relevant DRE configuration information, system information, subscriber information and the like to ensure that the generated proxy or proxies have all the information necessary to completely provision the DRE and, therefore, enable a zero-touch provisioning of the DRE in response to the QR code. This zero-touch provisioning or activation process may also be provided in response to a non-QR identifier, or by an update to a preconfigured database (e.g., mapping states/functions/ preference to this DRE) or other process. The Proxy Manager 113 manages the proxies, including defining/enabling responses to bar codes, QR codes, IP addresses, etc., assigning an ID to the proxies, assigning network parameters for the proxies, establishing communication links from the proxies to core network functions, and from the proxies to the distributed RAN elements (DREs).

For example, the creation of proxy elements as non-virtualized elements, virtualized elements, cloud-native virtualized elements, and the like that mirror all the functional elements (FEs) of the physical implementation of the 5G high performance function, such as a physical DU+Radio (e.g., Cell ID, RAN parameters, operational State, Neighbor relations, Security parameters, performance metrics, O&M and Traffic APIs). The proxy element resides in the virtualized network cloud or a separate cloud and is instantiated by the entry of a new network element in the management database (e.g., a proxy manager 13 or orchestrator proxy) or a QR code scan of a physical entity. The proxy element can be created before or after physical connectivity to the remote element implementing the 5G high performance function. A secure connection is established between the Proxy and the Physical DU (or physical implementation of some other 5G high performance function).

As step 230, each DRE is controlled/operated via its respective proxy, wherein FE changes from the network core or other management entities sent to the proxy are communicated by the proxy to the respective DRE, and FE changes sent from the DRE to the proxy are communicated by the proxy to the network core or other management entity by the proxy.

Generally speaking, the proxy manager 113 (or orchestrator proxy) provides all the necessary information to the DRE via the proxy, including the initial provisioning of the DRE via the proxy. When complete, the DRE is transitioned (via the relevant proxy) to an operational mode from a provisioning mode.

For example, the use of the "DU Proxy" 116-1 to instantiate and operate the actual physical distributed DU 150-1 and associated Radio(s). The management system (Proxy Orchestrator/Proxy Manager entity) instantiates the proxies. The proxies communicate with each other to determine all the relevant FEs that each new proxy needs to turn up and operate when being integrated to the network (same mechanism as in a non-cloud-native network, but communication is done through the cloud platform and is much easier to coordinate and manage). The proxy then transmits the FEs to the physical DU. The physical DU and RU comes online with zero-touch provisioning.

At step 240, DRE operation is monitored and the operation of individual DRE and the DRE population is optimized by one or more relevant management entities.

For example, the use of continuous, real-time performance optimization of physical/distributed elements by the cloud based proxies. The management system (Proxy Orchestrator/Proxy Manager entity) may be configured to enable inter-proxy peer-to-peer links between DU proxies. Communications may be Real-time or Event Based, and may be customized by the network operator, or implemented via ML. The management system (e.g., via the proxy manager 113) determines the optimal changes to FEs that need to be implemented on the respective proxies. This may be achieved through inter-working and coordination with other cloud-based network elements such as CU, RIC, and the like. The proxies 116 then transfer any changes to the physical DUs 150 via the secure links and the like. The proxies 116 may also have the ability to determine the local network level traffic based resource allocations of the physical DUs, and determine the optimal local resource allocations of the physical DUs so as to save energy, reduce interference, and maximize performance of the distributed RAN elements.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/ arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method managing distributed radio access network (RAN) elements within a network associated with a network core, the method comprising:
   for each of a plurality of distributed RAN elements (DREs) within the network associated with the network core, configuring a respective virtualized proxy element to (i) communicate with a respective one of the plurality of DREs for which the respective virtualized proxy element is configured, and (ii) mirror each of a plurality of functional elements (FEs) associated with the respective one of the plurality of DREs for which the respective virtualized proxy element is configured.

2. The method of claim 1, wherein the network core comprises a virtualized network core implemented via processing resources and non-transitory memory resources, the processing resources configured to execute software instructions stored in the non-transitory memory resources to provide thereby network core functions.

3. The method of claim 1, wherein the plurality of FEs associated with the respective one of the plurality of DREs comprise at least one of a Cell ID, RAN parameters, operational state, neighbor node relationships, security parameters, and performance metrics.

4. The method of claim 1, wherein the plurality of FEs associated with the respective one of the plurality of DREs further comprise at least one of O&M information and traffic APIs.

5. The method of claim 1, wherein the plurality of DREs comprise at least one RAN distributed unit (DU) configured to communicate via its respective virtual proxy element with the network core.

6. The method of claim 2, wherein the plurality of DREs comprise at least one RAN distributed unit (DU) configured to communicate via its respective virtual proxy element with a virtualized RAN centralized unit (CU).

7. The method of claim 1, wherein the plurality of DREs comprise at least one RAN radio unit (RU) configured to communicate via its respective virtual proxy element with the network core.

8. The method of claim 2, wherein the plurality of DREs comprise at least one RAN radio unit (RU) configured to communicate via its respective virtual proxy element with a virtualized RAN distributed unit (DU).

9. The method of claim 8, wherein the virtualized RAN distributed unit (DU) is configured to communicate with a virtualized RAN centralized unit (CU).

10. The method of claim 1, further comprising:
in response to network core discovery of a DRE within the network associated with the network core, instantiating the respective virtualized proxy element for the discovered DRE.

11. The method of claim 10, wherein the network core discovery of the DRE comprises receiving information including a scanned identifier associated with the DRE from a remote device proximate the DRE, and provisioning the DRE in accordance with the received DRE information.

12. The method of claim 11, wherein the scanned identifier comprises a QR code associated with the DRE.

13. The method of claim 11, wherein the information associated with the DRE includes at least one of location information, local network information, and subscriber information.

14. The method of claim 1, further comprising:
in response to entry of a new DRE in a management database, instantiating the respective virtualized proxy element for the respective one of the plurality of DREs.

15. The method of claim 2, wherein the proxy element is implemented using the processing and non-transitory memory resources common to those used to implement the network core.

16. The method of claim 2, wherein the proxy element is implemented using the processing and non-transitory memory resources separate from those used to implement the network core.

17. Computerized apparatus configured to implement network functions at a network core to manage distributed radio access network (RAN) elements within a network associated with the network core, the computerized apparatus comprising:
a processor apparatus;
network interface apparatus in data communication with the processor apparatus; and
storage apparatus in data communication with the processor apparatus and comprising a plurality of computerized instructions executable on the processor apparatus, the plurality of computerized instructions configured to, when executed by the processor apparatus, cause the computerized apparatus to:
for a plurality of distributed RAN elements (DREs) within the network associated with the network core, configuring a plurality of respective virtualized proxy elements to: (i) communicate with the plurality of DREs, respectively, and (ii) mirror each of a plurality of functional elements (FEs) associated with each of the plurality of DREs, respectively.

18. Computer readable apparatus comprising a non-transitory storage medium, the non-transitory storage medium comprising at least one computer program having a plurality of instructions, the plurality of instructions configured to, when executed on a processing apparatus, cause network equipment disposed at a network core to:
for each of a plurality of distributed RAN elements (DREs) within a network associated with the network core, configuring a respective virtualized proxy element to (i) communicate with a DRE of the plurality of DRE for which the respective virtualized proxy element is configured, and (ii) mirror each of a plurality of functional elements (FEs) associated with the DRE.

19. The computer readable apparatus of claim 18, wherein the network equipment comprises an operation, administration and maintenance (OAM) system configured to cooperate with the network core.

20. The computer readable apparatus of claim 18, wherein the network core comprises a virtualized network core implemented via processor and non-transitory memory, the processor configured to execute software instructions stored in the non-transitory memory to provide thereby network core functions.

* * * * *